United States Patent Office 3,736,148
Patented May 29, 1973

3,736,148
MEAT FOOD ANALOGS RESISTANT TO MICROBIAL SPOILAGE
Morris H. Katz, St. Louis Park, Minn., assignor to The Pillsbury Company, Minneapolis, Minn.
No Drawing. Filed June 28, 1971, Ser. No. 157,685
Int. Cl. A23l *3/34, 1/34*
U.S. Cl. 99—17          10 Claims

ABSTRACT OF THE DISCLOSURE

Meat food analogs which are resistant to microbial spoilage are comprised of vegetable protein, water, food solids other than vegetable protein dissolved or colloidally dispersed in the water to reduce the water activity ($a_w$) of the analogs to below 0.95, and sufficient acid to adjust the pH to between 3.0 and 5.4. The meat food analogs are analogous in texture, taste and apparent moist eating quality to freshly cooked, meat-type foods having a water content of over 55% and an $a_w$ of more than 0.98.

BACKGROUND OF THE INVENTION

The present invention relates to meat food analogs containing vegetable protein which are resistant to microbial spoilage.

Many efforts have been made to develop satisfactory meat substitutes and meat food analogs from vegetable protein that would simulate meat and meat-type foods in appearance, texture, taste and apparent moist eating quality. Satisfactory meat substitutes have been prepared from edible vegetable protein of, for example, soybeans, corn and peanuts.

The vegetable proteins, when used to simulate meat, are generally produced in the form of fibers or filaments which are coagulated and stretched. The filaments are then placed in a salt solution to prevent them from redissolving. Groups of these filaments can be formed into bundles and mixed with suitable colors and flavors to obtain meat-like products.

When vegetable protein is utilized in simulating comminuted meat-type products, the need for fibrous structure is not as vital. Therefore, texture vegetable protein manufactured by compression, extrusion or puffing is more commonly used in these products.

Methods of forming various types of textured vegetable protein and processes for utilizing that protein in meat-like foods are disclosed in the following representative U.S. patents: Boyer, U.S. Pat. 2,730,447; Boyer, et al., U.S. Pat. 2,730,448; Rusoff, et al., U.S. Pat. 3,047,395; Kjelson, U.S. Pat. 3,343,563; and Dundman, U.S. Pat. 2,785,069. All of these patents represent valuable improvements in the art; however, the problems involving microbial spoilage are not discussed or solved.

The meat-like products of the prior art, like their real meat counterparts, generally have a relatively high water content, a high $a_w$ in the range of 0.98 to 1.0 and a pH above 5.5. Under these conditions, shelf life of the resultant product is very short, even under refrigerated conditions. Microbial spoilage and the growth of pathogenic organisms like salmonella, botulinus and staphylococcus in these products are a constant threat.

SUMMARY OF THE INVENTION

The primary object of this invention is to provide meat food analogs which are resistant to microbial spoilage and are analogous in texture, taste and apparent moist eating quality to freshly cooked, meat-type foods which have a water content of over 55% and an $a_w$ of more than 0.98.

Another object is to provide meat food analogs comprised of vegetable protein, water and food solids other than vegetable protein dissolved or colloidally dispersed in the water.

A further object is to provide meat food analogs having an $a_w$ of below 0.95 and a pH between 3.0 and 5.4 which are resistant to microbial spoilage.

The meat food analogs of this invention are analogous in appearance, texture, taste and apparent moist eating quality to freshly cooked meat-type foods having a water content of over 55% and $a_w$ of more than 0.98. The analogs comprise from about 3% to about 25% protein of vegetable origin, from about 35% to about 55% water, from about 5% to about 46% of food solids other than vegetable protein dissolved or colloidally dispersed in the water to reduce the $a_w$ to below 0.95, and sufficient acid to adjust the pH to between 3.0 and 5.4. By adjusting the pH and lowering the $a_w$ of the meat food analog, the analog is rendered highly resistant to microbial spoilage and to the growth of pathogenic organisms thereon.

DESCRIPTION OF THE PREFERRED EMBODIMENTS

This invention relates to meat food analogs containing substantial amounts of vegetable protein. These are rendered highly resistant to microbial spoilage by conforming them to certain analytical constraints atypical of the meat products being simulated.

More specifically, the meat food analogs of this invention are comprised, by weight of the analog, of from about 3% to about 25% vegetable protein, from about 35% to about 55% water, and from about 5% to about 46% of food solids other than vegetable protein dissolved or colloidally dispersed in the water. The dissolved and colloidally dispersed solids lower the $a_w$ of the meat food analogs to below 0.95. Sufficient food grade acid is added to the analogs to attain a pH of from about 3.0 to about 5.4. Within the pH, water activity, and water content constraints of this invention, pathogenic organisms cannot grow in or on the meat food analogs and the analogs are highly resistant to microbial spoilage. The meat food analogs are designed, by proper use of available flavors and texture modifiers, to have substantially the same visual appearance, taste, texture and apparent moist eating qualities as the meat-type foods being simulated.

The meat food analogs of this invention are designed to simulate meat-type foods which have a water content of over 55% and an $a_w$ of over 0.98. Most of these meat-type foods have water contents of over 60% and an $a_w$ of over 0.99. Another analytical characteristic typical of the meat-type foods being simulated in a pH generally above 5.5. Most of these foods have a pH of between 5.5 and 7.5. Because of the large amount of free water and the relatively high pH of these foods, shelf life has always posed substantial problems as microorganisms, including pathogens, grow readily in this environment.

The meat-type products simulated by the meat food analogs of this invention are generally considered to be low acid foods. Examples of the meat-type products, their water content, pH, and $a_w$ are shown in Table 1. The values given in Table 1 are average values derived from experimental evidence and published data.

TABLE 1

| Product | Water content (percent) | Water activity | pH |
|---|---|---|---|
| Italian meat balls | 64 | 0.98 | 6.0 |
| Hash patties | 70 | 0.99 | 6.0 |
| Chicken chow mein | 78 | 0.99 | 6.0 |
| Chili | 70 | 0.99 | 5.5 |
| Hamburger patties | 60 | 0.98 | 6.0 |
| Curried shrimp | 78 | 0.99 | 6.0 |
| Beef Stroganoff | 75 | 0.98 | 5.6 |
| Shrimp de Johngue | 78 | 0.99 | 5.6 |
| Barbecued beef burgers | 64 | 0.98 | 6.0 |
| Italian sausage, fresh | 55 | 0.98 | 5.8 |
| Barbecued chicken | 58 | 0.98 | 6.0 |
| Minced ham | 62 | 0.98 | 6.0 |

As used herein "meat" shall include, but not be limited to, red meat such as beef, veal, lamb and pork, fowl such as chicken and turkey, and seafood and fresh water fish including lobster, shrimp, clams, oysters and the like. The products derived from meat which the analogs of this invention simulate, in addition to the above-defined meats, generally contain one or more of the following components: vegetables, sauces, gravies, fats, oil, spices, flavors and seasonings.

The term "water activity" or "$a_w$" is used throughout this specification and the claims to describe the relative availability of water in various products including the meat food analogs. Water activity ($a_w$) as used herein is defined as follows:

$$a_w = \frac{P}{P_o} \text{ at temperature T}$$

where P is the water vapor pressure of the solution and $P_o$ is the vapor pressure of pure water.

The physical chemist also defines water activity as:

$$a_w = \frac{f}{f_o}$$

where $f$ is the fugacity of water vapor in the specified system, and $f_o$ is the fugacity of pure water at the specified system temperature and 1 atmosphere total pressure. Water activity is explained in more detail in an article entitled "Water Relations of Food Spoilage Microorganisms" by W. J. Scott published in Advances in Food Research, vol. 7, pages 83–127 (1957).

The meat food analogs of this invention are comprised of four major constituents: protein of vegetable origin, water, food solids other than vegetable protein and sufficient acid to adjust the pH of the meat food analog to between 3.0 and 5.4. Other components can be added to the analog such as vegetables, spices, flavors, seasonings, fats, oils, sauces, gravies, texture modifiers and meat protein.

All of the meat food analogs of this invention contain from about 3% to about 25% protein of vegetable origin. The amount of vegetable protein used in these analogs is primarily dependent upon the particular meat-type food being simulated. For example, the amount of vegetable protein utilized in chili would be substantially less than that used in a meatball.

The vegetable protein utilized herein can be derived from a number of plant sources including, for example, soybeans, corn, peanuts and wheat. The vegetable protein can be obtained commercially as a flour or in a wide variety of textures. The selection of the vegetable protein is primarily dependent upon the desired texture of the meat food analog. Desirable vegetable proteins are disclosed in U.S. Pats. 2,730,447 and 2,874,049.

Preferably, the vegetable proteins are used herein in a dehydrated state. The vegetable protein can thereby be utilized to decrease the amount of "free water" and reduce the water activity of the finished products.

Water comprises from about 35% to about 55% by weight of the meat food analog and, preferably, from about 45% to about 50% by weight of the analog. Within this range, the meat food analog, by proper formulation, has the apparent moist eating quality, texture, and taste of the meat-type food being simulated yet the water content of the analog is substantially below that of the product being simulated. This atypical water content is beneficial in controlling the growth of microorganisms in and on the meat food analog.

To decrease the water activity of the meat food analog to below 0.95, and preferably to 0.90 or below, and thereby obtain additional control of the growth of microorganisms, about 5% to about 46% of food solids other than vegetable protein are dissolved are colloidally dispersed in the water. The terms "dissolved" and "colloidally dispersed" as they apply to the use of food solids in the aqueous phase of the meat food analog are used interchangeably herein as true solutions and colloidal dispersions are difficult to distinguish.

The preferred food solids for reducing the $a_w$ of the meat food analogs are selected from the group consisting of sugars, polyhydric alcohols and salts.

Representative sugars that can be utilized herein are fructose, galactose, dextrose, mannose, lactose, sucrose and maltose. These sugars can be utilized singly or in combination with each other. Mixed sugar syrups are also useful herein because of their texture modifying properties in addition to the $a_w$ control. Mixed sugar syrups are characterized by the hydrolysates of polymeric carbohydrates such as starch or cellulose as illustrated by corn syrup, a corn starch hydrolysate.

The polyhydric alcohols utilized herein generally contain from 3 to 6 carbon atoms and from 2 to 6 hydroxyl groups. The polyhydric alcohols must be non-toxic and food grade for use in the meat food analogs of this invention. Examples of suitable polyhydric alcohols include sorbitol, mannitol, glycerol and propylene glycol.

A number of salts can be utilized to control the $a_w$ of the meat food analog. Representative salts are the sodium, potassium, ammonium and calcium salts of hydrochloric acid, nitric acid, nitrous acid, citric acid, lactic acid, tartaric acid, malic acid and phosphoric acid. Sodium chloride is highly preferred for use herein.

In addition to the preferred food solids for reducing the water activity of the meat analog, the following general classifications of food products can be used in combination with the preferred substances for this purpose: humectants, starches, pectin and other hydrocolloids. As is well recognized, some of the polyhydric alcohols function as humectants and syrups containing sugars also serve as humectants.

The food solids are dissolved or colloidally dispersed in the aqueous phase of the meat food analog thereby reducing the availability of water to microorganisms and concomitantly reducing the water activity to below 0.95, and preferably to 0.90 or below. By reducing the availability of water to microorganisms, microbial spoilage is substantially inhibited and the growth of pathogenic organisms is stopped completely.

It is highly preferred herein that combinations of sugars and salts be utilized to reduce water activity. The tart taste caused by addition of acid to the analog can be minimized by the addition of sugars. The sugars and salts can be utilized in such proportions that the resultant analog will have a bland flavor that is readily covered with a more suitable meat-type flavor.

Sufficient food grade acid is utilized to adjust the pH of the meat food analog to between 3 and 5.4 with a pH between 4.5 and 5.0 being highly preferred. At the lower end of the pH range, the acid taste of the analog becomes very difficult to mask with conventional flavoring agents. At the upper end of the scale, near 5.4, some microorganisms may grow in spite of the low water activity. The pH range of 4.5 to 5 is advantageously utilized because of the greater microbial stability with less attendant acid taste. Acids preferred for use herein are food grade acids such as lactic, citric, acetic and hydrochloric acids.

It is also highly preferred that the meat food analog of this invention contain from 5% to 20%, and preferably from 10% to 15%, of a food grade oil or fat. The fat content helps simulate textural and eating qualities of real meat. Additionally, the fat content contributes significantly to the apparent moist eating quality of the meat food analog of this invention. Any of the food grade fats or oils can be utilized herein. These fats and oils include soybean oil, cottonseed oil, corn oil, coconut oil, palm kernel oil, olive oil, peanut oil, sesame seed oil, safflower oil, tallow, lard, chicken fat, butter and the like. All of these fats and oils may be partially or fully hydrogenated.

It is highly preferred to use texture modifiers in this invention to obtain desired product characteristics. The texture modifiers are used in amounts sufficient to obtain these characteristics. Examples of texture modifiers useful herein include starchy or proteinaceous natural food materials such as sweet potato, Irish potato, corn meal, hominy grits, rice, tapioca, starch sponge, wheat bran, wheat shorts, prepared cereal foods, soya grits, cereal mill meal and the like. Also useful herein are gelatinized starches, film formers and gums, and various surfactant systems. Many of these components are disclosed in Katz, U.S.P. 3,434,848 and Katz, U.S.P. 3,582,357.

Another optional component of the meat food analog is real meat. Meat can be diced, cubed or ground and added directly to the meat food analog. Cheaper cuts of meats can be utilized because the meat can be extensively processed prior to incorporation into the meat food analog and the texture can be derived from the vegetable protein, texture modifiers and/or meat particles.

Preservatives are generally incorporated into the meat food analogs of this invention to inhibit the formation of mlod. Sorbic acid, propionic acid, benzoic acid and p-hydroxyl benzoic acid and the sodium and calcium salts of these acids are useful in this regard. Other preservatives commonly known in the art can also be utilized. Suitable colors, flavors, and spices for use in food materials can be used herein to obtain proper visual appearance and flavor.

EXAMPLES

The following examples merely serve to illustrate the invention in specific detail and are not intended to restrict this invention. All parts, percentages and ratios set forth herein are by weight unless otherwise indicated.

Example I.—Ham loaf analog

A meat food analog simulating a ham loaf was prepared from the following formula:

| Ingredient: | Percent |
| --- | --- |
| Glycerol | 1.75 |
| Potassium sorbate | 0.04 |
| Water | 37.04 |
| Hydrogenated vegetable oil | 14.00 |
| Smoke flavor | 1.70 |
| Ham flavor | 0.90 |
| Salt | 3.00 |
| Corn syrup solids (dextrose equivalent=28) | 13.70 |
| Artificial color | 0.04 |
| Flavored textured soy protein made by extrusion | 8.50 |
| Lactic acid | 0.70 |
| Textured soy flour made by compression | 15.13 |
| Gelatinized starch | 3.50 |
| | 100.00 |

The soy flour used in this example comprised 52% protein, 7% water, 36% carbohydrate and 5% ash.

The potassium sorbate, water, smoke flavor, ham flavor, salt, artificial color, soy protein and soy flour were blended together and the mixture was allowed to hydrate for 20 minutes. The mixture was transferred to the top half of a double boiler and the glycerol, vegetable oil, corn syrup solids, lactic acid and gelatinized starch were blended into the mixture at a temperature of about 180° F.

The mixture was formed into a loaf and cooled. The ham loaf analog was similar in appearance to a ham loaf and had substantially the same texture, taste and apparent moist eating quality as a ham loaf. Analytically, the ham loaf analog contained 37% water, had a pH of 5.30 and a water activity of 0.90.

Separate samples of the ham loaf were each inoculated with two cultures of staphylococci and two cultures of salmonella (*S. infantis* and *S. schwarzengrund*). One sample was held at 90° F. for nine days and another sample was held between 45° F. and 65° F. for nine days. No growth of the organisms was observed. In fact, the organisms in the inoculum dried rather rapidly.

Example II.—Onion meat loaf analog

A meat food analog simulating an onion meat loaf was prepared from the following formula:

| Ingredient: | Percent |
| --- | --- |
| Dried onion pieces | 11.00 |
| Shortening | 17.00 |
| Garlic powder | .20 |
| Salt | 3.00 |
| White pepper | .50 |
| Gelatinized starch | 3.00 |
| Textured soy flour made by compression | 10.00 |
| Lactic acid | .50 |
| Flavored textured soy protein made by extrusion—beef style flavor | 5.00 |
| Imitation flavor | .06 |
| Water | 49.74 |
| | 100.00 |

The soy flour was the same as that used in Example I. The dried onion pieces comprised about 82% carbohydrates of which about 65% of the total carbohydrate was sugar.

The dried onion pieces, garlic powder, salt, pepper, soy flour, soy protein, imitation flavor and water were blended and allowed to hydrate for 20 minutes. The mixture was transferred to the top half of a double boiler and the shortening, gelatinized starch and lactic acid were blended into the mixture at a temperature of about 180° F.

The mixture was formed into a loaf and cooled. The analog was similar in appearance to a meat loaf and had substantially the same texture, taste and apparent moist eating quality as a meat loaf. Analytically, the meat loaf had a pH of 5.2, a water content of 47.1% and an $a_w$ of 0.95.

When this analog is inoculated with microorganisms as disclosed in Example I, substantially no growth occurs.

Example III.—Meatball analog

A meat food analog simulating a meatball was prepared from the following formula:

| Ingredient: | Percent |
|---|---|
| Flavored textured soy protein made by extrusion | 9.84 |
| Dried onion pieces | 1.37 |
| Tomato puree (6% sugar) | 12.81 |
| Italian seasoning | 0.65 |
| Dried sweet bell peppers | .26 |
| Imitation beef flavor (38% salt) | 2.30 |
| Vegetable oil (Durkex 500) | 12.50 |
| Textured soy flour made by compression | 11.23 |
| Gelatinized starch | 3.00 |
| Lactic acid | 0.75 |
| Glycerol | 2.50 |
| Salt | 1.70 |
| Water | 40.99 |
| | 100.00 |

The soy flour used in this example has the same composition as that used in Example I. The dried onion has the same composition as that used in Example II.

The soy protein, soy flour, onion pieces, tomato puree, Italian seasoning, peppers, beef flavor and water were blended together and allowed to hydrate for 20 minutes. The mixture was transfererd to the top half of a double boiler and the oil, gelatinized starch, salt, lactic acid and glycerol were blended into the mixture at a temperature of about 180° F.

The mixture was formed into balls and cooled. The meatball analogs were similar in appearance to meatballs and had substantially the same texture, taste and apparent moist eating quality as a meatball. The pH of the product was 5.1, the water content was 52.6% and the $a_w$ was 93.

When this analog is inoculated with microorganisms as disclosed in Example I, substantially no growth occurs.

Example IV.—Chicken chop suey analog

A meat food analog simulating chicken chop suey was prepared from the following formula:

| Ingredient: | Percent |
|---|---|
| Dried onions | 1.60 |
| Dried green peppers | .30 |
| Vegetable oil | 10.00 |
| Gelatinized starch | 3.00 |
| Lactic acid | .25 |
| Glycerol | 2.50 |
| Salt | 2.25 |
| Water | 41.90 |
| Potassium sorbate | .04 |
| Red pepper | .30 |
| Textured soy protein made by extrusion | 17.00 |
| Fresh celery | 8.00 |
| Corn syrup (dextrose equivalent=42) | 10.61 |
| Meat flavor (35% salt) | 2.25 |
| | 100.00 |

The dried onions have the same composition as those used in Example II.

The dried onions, peppers, salt, water, potassium sorbate, soy protein, fresh celery, and meat flavor were blended and allowed to hydrate for 20 minutes. The mixture was transferred to the top half of a double boiler and the oil, lactic acid, starch, glycerol and corn syrup were blended therewith at a temperature of about 180° F.

The analog was flowable and had the same consistency and appearance as chicken chop suey or chicken chow mein. The analog had substantially the same texture, taste and apparent moist eating quality as chicken chop suey. The pH of the mixture was about 5.0 and the $a_w$ was about 0.90.

If this analog is inoculated with microorganisms as disclosed in Example I, substantially no growth will occur.

EXAMPLE V.—Beanless chili analog

A meat food analog simulating beanless chili was prepared from the following formula:

| Ingredient: | Percent |
|---|---|
| Dried onions | 1.60 |
| Dried green peppers | .30 |
| Vegetable oil | 10.00 |
| Gelatinzed starch | 3.00 |
| Lactic acid | .25 |
| Glycerol | 2.50 |
| Salt | 2.25 |
| Water | 41.90 |
| Potassium sorbate | .04 |
| Red pepper | .30 |
| Textured soy protein made by extrusion | 17.00 |
| Tomato puree (6% sugar) | 8.00 |
| Corn syrup (dextrose equivalent=42) | 10.61 |
| Chili seasoning | 2.25 |
| | 100.00 |

The dried onions have the same composition as those used in Example II.

The dried onions, peppers, salt, water, potassium sorbate, soy protein, tomato puree and chili seasoning were blended and allowed to hydrate for 20 minutes. The mixture was transferred to the top half of a double boiler and the oil, lactic acid, starch, glycerol and corn syrup were blended therewith at a temperature of about 180° F.

The analog was flowable and had the same consistency and appearance as chili. The pH was about 4.9 and the $a_w$ was about 0.90.

When this analog is inoculated with microorganisms as disclosed in Example I, substantially no growth appears.

Example VI

Results substantially similar to those obtained in the foregoing examples are obtained when the following acids are substituted for lactic acid: citric acid, acetic acid and hydrochloric acid. When in the previous examples vegetable protein filaments, spun vegetable protein, puffed vegetable protein, extruded or compressed vegetable protein are substituted for the extruded or compressed vegetable proteins substantially the same results are achieved.

Substantially the same results are obtained in the previous examples when sorbitol, mannitol or propylene glycol are substituted for glycerol. A portion of the sodium chloride in the previous examples can be replaced with substantially the same results in reducing the $a_w$ with potassium chloride, potassium nitrate, potassium tartrate, sodium nitrate, sodium nitrite, sodium citrate, sodium phosphate, calcium chloride, calcium nitrate and calcium phosphate.

What is claimed is:

1. Meat food analogs resistant to microbial spoilage and analogous in texture, taste and apparent moist eating quality to freshly cooked, meat-type foods having a water content of over 55% and a water activity of more than 0.98, said analogs having a water activity below 0.95 and comprising in percent by weight of the meat food analog:
   (a) from about 3% to about 25% protein of vegetable origin;
   (b) from about 35% to about 55% water;

(c) from about 5% to about 46% of food solids other than vegetable protein, said solids being dissolved or colloidally dispersed in said water; and (d) sufficient food grade acid that the pH of said meat food analog is between 3.0 and 5.4.

2. The meat food analog of claim 1 containing sufficient acid that the pH is between 4.5 and 5.0.

3. The meat food analog of claim 2 wherein the acid is selected from the group of food grade acids consisting of lactic, citric and acetic and hydrochloric acids.

4. The meat food analog of claim 1 wherein the protein of vegetable origin is a textured vegetable protein.

5. The meat food analog of claim 4 wherein the food solids other than vegetable protein are selected from the group of water soluble or colloidally dispersible food grade solids consisting of salts, sugars, polyhydric alcohols, said alcohols containing from 2 to 6 hydroxyl groups and from 3 to 6 carbon atoms, and mixtures thereof.

6. The meat food analog of claim 5 having an $a_w$ of 0.90 or below.

7. The meat food analog of claim 6 wherein the analog contains from about 45% to about 50% water.

8. The meat food analog of claim 7 containing sufficient acid that the pH is between 4.5 and 5.0.

9. The meat food analog of claim 6 containing from about 10% to about 15% of a food grade fat or oil.

10. The meat food analog of claim 5 containing from about 5% to about 20% of a food grade fat or oil.

References Cited

UNITED STATES PATENTS

| | | | |
|---|---|---|---|
| 3,047,395 | 7/1962 | Rusoff et al. | 99—14 |
| 3,343,963 | 9/1967 | Kjelson | 99—14 |

RAYMOND N. JONES, Primary Examiner

J. R. HUFFMAN, Assistant Examiner

U.S. Cl. X.R.

99—150 R